United States Patent [19]

Knape et al.

[11] 4,241,714
[45] Dec. 30, 1980

[54] SOLENOID VALVE CONTROLLED FUEL INJECTION PUMP

[75] Inventors: Richard S. Knape; Richard A. Moreau, both of Grand Rapids, Mich.

[73] Assignee: General Motors Corporation, Detroit, Mich.

[21] Appl. No.: 51,887

[22] Filed: Jun. 25, 1979

[51] Int. Cl.³ .................. F02M 37/04; F04B 49/00
[52] U.S. Cl. .................................. 123/499; 123/500; 123/506; 417/298; 417/302
[58] Field of Search ...... 123/139 E, 139 AF, 139 AE, 123/139 AD, 139 AR; 417/298, 302, 505

[56] References Cited

U.S. PATENT DOCUMENTS

| | | | |
|---|---|---|---|
| 3,648,673 | 3/1972 | Knape | 123/140 FG |
| 3,724,436 | 4/1973 | Nagata et al. | 123/139 E |
| 3,779,225 | 12/1973 | Watson et al. | 123/139 E |
| 3,880,131 | 4/1975 | Twaddell et al. | 123/139 E |
| 4,046,112 | 9/1977 | Deckard | 123/139 E |
| 4,129,253 | 12/1978 | Bader, Jr. et al. | 123/139 E |
| 4,164,326 | 8/1979 | Deckard | 123/139 E |

FOREIGN PATENT DOCUMENTS

2013275  8/1979  United Kingdom ............ 417/505

*Primary Examiner*—Ira S. Lazarus
*Assistant Examiner*—Magdalen Moy
*Attorney, Agent, or Firm*—Arthur N. Krein

[57] ABSTRACT

A separate valve, rotatable with a pump control valve in a multiple plunger type fuel injection pump used to sequentially supply fuel to a number of fuel injection nozzles, is actuated by a solenoid to control fuel spill from each plunger whereby to control quantity and timing of injection.

4 Claims, 6 Drawing Figures

SOLENOID VALVE CONTROLLED FUEL INJECTION PUMP

This invention relates to a fuel injection pump and, in particular, to a solenoid valve controlled diesel fuel injection pump adapted to deliver metered amounts of fuel to each of a plurality of fuel injection nozzles located to discharge fuel into the associated cylinders of an internal combustion engine.

DESCRIPTION OF THE PRIOR ART

Multiple plunger fuel injection pumps of the type used to sequentially supply fuel to a plurality of injection nozzles for direct injection into the associated cylinders of a diesel engine are well known, as disclosed, for example, in U.S. Pat. No. 3,648,673 entitled "Fuel Injection Pump" issued Mar. 14, 1972 to Richard S. Knape. In this type multiple plunger fuel injection pump, a rotatably control valve, which is also axially movable as by a mechanical or hydraulic regulator, is used to control the quantity of fuel supplied to each nozzle for injection into an associated cylinder as function of engine speed and load conditions.

Distributor type fuel injection pumps, similar to that shown for example in U.S. Pat. No. 3,880,131 entitled "Fuel Injection System for an Internal Combustion Engine" issued Apr. 29, 1975 to Russell W. Twaddell and Edwin B. Watson, which use one or two solenoid valves operated on electronic command for controlling the fuel quantities to be injected as a function of engine operation are also well known. It is well known in the art that an electronic regulated fuel pump permits a more accurate control of fuel injection and that such an electronic regulated fuel pump, per se, is also normally less expensive to build than a mechanical or hydraulic regulated fuel pump.

SUMMARY OF THE INVENTION

The present invention relates to a multiple plunger fuel injection pump assembly in which the fuel delivered from individual pump plungers is controlled by a single solenoid valve that is connectable so as to be energized by a suitable electronic control device as a function of engine operating conditions.

It is therefore a primary object of the invention to provide an improved multiple plunger type fuel injection pump wherein a single solenoid actuated valve is incorporated therein so as to control both the start and end of fuel injection and thereby to also control the quantity of fuel injected.

Another object of the invention is to provide an improved fuel injection pump for an internal combustion engine in which the fuel delivered by the individual pump plungers to their respective associated fuel injection nozzles is controlled by a solenoid valve that is adapted to be electronically actuated as a function of engine operation.

A further object of the invention is to provide an improved fuel injection pump that utilizes a single solenoid actuated, rotatable valve to sequentially control the output of a plurality of pump plungers, the number of such plungers corresponding to the number of cylinders in an associated engine.

Still another object of the present invention is to provide a fuel injection pump of the above type which includes features of construction, operation and arrangement, rendering it easy and inexpensive to manufacture, and in other respects suitable for use on diesel engines.

For a better understanding of the invention, as well as other objects and further features thereof, reference is had to the following detailed description of the invention to be read in connection with the accompanying drawings, wherein:

FIG. 3 is an end view of the drive shaft end of the subject fuel injection pump taken along line 3—3 of FIG. 2;

FIG. 4 is a cross-sectional view taken along line 4—4 of FIG. 2 showing a portion of the cam and a magnetic sensor used to provide a rotational pump speed signal for an electronic control device;

FIG. 5 is a cross-sectional view of the pump control valve and valve sleeve of the subject fuel injection pump assembly taken along line 5—5 of FIG. 2; and, FIG. 6 is a cross-sectional view of a portion of the subject fuel injection pump but showing an alternative embodiment of a pump control valve and solenoid valve arrangement for controlling fuel discharged from the pump.

BRIEF DESCRIPTION OF THE DRAWINGS

Figures 1, 2:
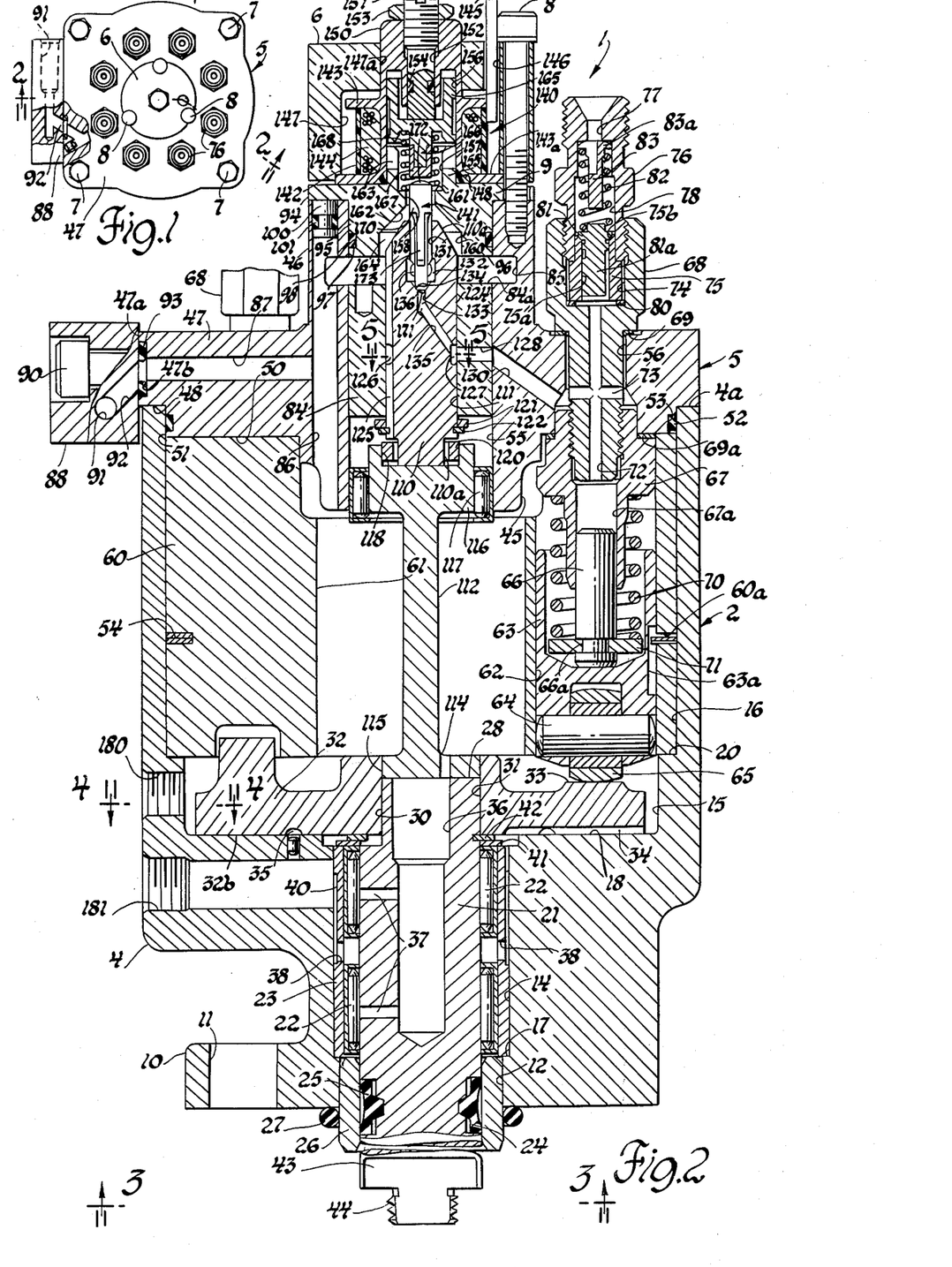
FIG. 1 is an end view of the discharge end of a multiple plunger fuel injection pump in accordance with the invention.
FIG. 2 is a cross-sectional view taken along the line 2—2 of FIG. 1 of the subject fuel injection pump with a preferred embodiment of a control valve and associated solenoid valve incorporated therein and constructed in accordance with the invention, with various elements thereof shown in elevation.

Referring now to the drawings and in particular to FIG. 2, the fuel injection pump, generally designated 1 of the invention includes a pump housing 2 which, in order to facilitate assembly of the internal components of the pump assembly, is formed so as to include a housing 4, a pump body 5 and a cover 6. The pump body 5 and housing 4 are suitably secured together as by bolts 7. The cover 6 is suitably secured to the pump body 5, as by capped screws 8, with the mounting flange of a solenoid pole piece 9, of a solenoid assembly to be described in detail hereinafter, sandwiched therebetween.

The housing 4 at its free end, the lower end with reference to FIG. 2, is provided with a radially outward extending mounting flange 10 having a plurality of bolt receiving arcuate apertures 11 extending therethrough (FIGS. 2, 3), whereby the pump assembly can be mounted to an internal combustion engine, not shown, so as to driven thereby in a manner to be described. Housing 4 is provided with an axial stepped through bore to provide, in the construction shown, starting from the bottom with reference to FIG. 2, an outboard inner wall 12, a bearing receiving inner wall 14, an intermediate inner wall 15 and a cage receiving inner wall 16, all of these internal walls being cylindrical. Walls 14, 15 and 16 are of progressively larger internal diameter relative to the internal diameter of wall 12. Walls 12 and 14 are interconnected by a flat shoulder 17. Walls 14 and 15 are interconnected by a stepped shoulder which includes a flat cam bearing surface 18 of a suitable predetermined radial extent. Walls 15 and 16 are interconnectd by a flat shoulder 20.

A drive shaft 21, which would be driven through a suitable power take-off from the engine, not shown, is rotatably journaled by a pair of axially spaced apart bearings 22 which in turn are supported by a sleeve 23 positioned in the wall 14, with one end of the sleeve 23 abutting against the shoulder 17. As seen in FIG. 2, the drive shaft 21 is provided toward its outboard or lower end with a stepped T-shaped groove 24 which is adapted to receive an annular seal 25, also of T-shape in cross-section. Annular seal 25, in turn, is sealingly encircled by a seal sleeve 26 that is press fitted into the portion of the stepped bore in the housing 4 defined by the wall 12. An O-ring seal 27 is positioned to encircle seal sleeve 26 and to abut against the lower end of housing 4 to effect further sealing when the pump assembly 1 is mounted to an engine, not shown.

The drive shaft 21 is provided, at its inboard end, with a recessed radial, cross slot 28 for a purpose to be described, and with a pair of opposed flats 30, only one being shown in FIG. 2, on its outer peripheral surface to provide driving engagement surfaces for abutment against a complimentary shaped internal drive bore 31 provided in an annular cam 32.

Cam 32 has an annular angled upper cam surface 33 to effect reciprocation of a plurality of pump plungers by means of cam followers, all to be described in detail hereinafter. The lower flat bearing surface 32b of cam 32 which engages cam bearing surface 18 of housing 4 is provided with at least one radial groove 34 and an annular groove 35 which intersects the groove 34 for the flow of oil to effect lubrication of the surfaces 32b and 18.

The drive shaft 21 at its inboard end is also provided with an axial blind bore passage 36 and with one or more radial passages 37, two such passages 37 being shown in the construction illustrated, that open into the bore passage 36. These passages are provided in the drive shaft for the flow of oil for lubrication from within the pump housing for lubricating the bearings 22. For this purpose, the sleeve 23 is also provided with radial ports 38 which are located so as to be in flow communication with axial extending oil passages defined by the flats 40 formed on the outer peripheral surface of the sleeve 23 and the internal peripheral surface of the wall 14, as seen in FIG. 2.

In the construction shown, the drive shaft 21 is retained against axial displacement with respect to the bearings 22 by means of a thrust washer 41 which abuts against the other or upper end of sleeve 23 and by a retaining ring 42. The retaining ring 42 is positioned in a suitable annular groove provided for this purpose in the drive shaft 21. The drive shaft 21 at its outboard end, the lower end with reference to FIG. 2, is provided, in the construction shown, with opposed driving flats 43 and with external threads 44 whereby it can be connected via a suitable coupling, not shown, to a power take-off of an engine, not shown.

Referring now to the pump body 5, in the construction illustrated, this pump body includes a cylindrical lower stepped boss 45, a cylindrical upper boss 46 and an integral, intermediate radial flange 47 therebetween. Flange 47 is suitably machined or otherwise formed so as to provide a flat radial mounting flange surface 48 adjacent to its outer peripheral edge for abutment against the flat, upper annular end surface 4a of the housing 4, and a flat bottom surface 50. The mounting flange surface 48 and flat bottom surface 50 are interconnected by a cylindrical outer wall 51 which is of a diameter so as to be slidably received by the wall 16 in housing 4. A ring type seal 52 is positioned in an annular groove 53 provided, for example as shown, in the wall 51, whereby the seal 52 can provide a fluid tight seal between the pump body 5 and an upper portion of the inner wall 16 of the housing 4.

Pump body 5 is formed with a central axial through bore to provide a cylindrical internal wall 55 of predetermined inside diameter. Pump body 5 is also provided with a plurality of circumferentially, equally spaced apart stepped bores 56 which extend through the flange 47 radially outward of the bosses 45 and 46. The number of bores 56 corresponds to the number of cylinders in the engine with which the subject pump assembly is to be usd, there being eight such bores 56 in the construction illustrated for use with an eight cylinder engine. Only one such bore 56 is shown in FIG. 2.

A pump follower cage 60, in the form of a cylindrical sleeve, is positioned in the housing 4 so as to be aligned by the cage receiving inner wall 16 of the housing 4. This cage 60 is axially retained by having its lower end, with reference to FIG. 2, in abutment against the shoulder 20, and its axial extent is such that its opposite end is located so as to preferably abut against the flat bottom surface 50 of the pump body 5. The pump follower cage 60 is also provided with a central, axial through bore 61 and with a plurality of circumferentially equally spaced apart follower guide bores 62 located radially outward of bore 61. The number of such guide bores 62 will of course correspond to the number of bores 56 in the pump body 5 and is axially aligned with an associated bore 56. Only one such follower guide bore 62 and its associated bore 56 is shown in FIG. 2.

Each such follower guide bore 62, in the pump follower cage 60, has a cylindrical cam follower 63 slidably mounted therein. Each cam follower 63 carries at its lower end a roller shaft 64 which rotatably supports a cam follower roller 65 positioned for rolling contact engagement with the upper cam surface 33 of cam 32 whereby to effect reciprocation of an associated pump plunger 66. Each cam follower 63 has a plunger 66 operatively associated therewith, the plunger 66 being reciprocably mounted in an associated cylinder bore 67a of a plunger bushing 67 suitably secured in an associated stepped bore 56.

Each plunger bushing 67, in the construction shown, is secured in its associated stepped bore 56 by a retraction valve holder fitting 68, the lower end of which is threadedly engaged with the internally threaded upper end of the cylinder bore 67a in the associated plunger bushing 67. Suitable gaskets 69 and 69a are positioned to effect a seal between the fitting 68 and pump body 5 and between the pump body 5 and plunger bushing 67, respectively.

As seen in FIG. 2, each such plunger 66 is normally biased in a direction, downward with reference to FIG. 2, by means of a follower spring 70. One end of the follower spring 70 is in engagement with a lower stepped portion of its associated plunger bushing 67 and the other end of the spring is in engagement with a notched plunger retainer 71 secured in an annular undercut portion 66a of its associated plunger 66. The follower spring 70 is also operative to bias the cam follower roller 65 of the associated cam follower 63 into driven engagement with the upper cam surface 33 of cam 32.

As shown in FIG. 2, each cam follower 63 is provided with a flat outer side wall portion 63a intermediate its ends and formed at right angles to the axis of the roller shaft 64. This side wall portion 63a is located so as to prevent rotation of the cam follower 63 by engaging a split ring 54 located in an annular groove 60a provided in the outer peripheral wall of cage 60. The split ring 54 is of a suitable width so that the inner peripheral edge thereof projects part way into each of the follower guide bores 62 for effecting non-rotational alignment of the cam follower.

Each retraction valve holder 68 is provided with a stepped through bore which at its lower end defines an axial passage 72 that is in communication at one end with the cylinder bore 67a and intermediate its end with an intersecting radial passage 73 extending through the retraction valve holder 68. At its upper end this bore defines an internally threaded upper internal wall 74 which is adapted to receive a retraction valve seat 75 and to also receive the lower external threaded end of a fitting 76. Fitting 76 is adapted to be connected by an injection conduit, not shown, to an associated fuel injection nozzle, not shown.

Each fitting 76 is provided with a stepped axial through bore to define an outlet passage 77 at its upper end, with reference to FIG 2, and an enlarged valve receiving cavity 78 at its lower end. The retraction valve seat 75, in the form of a centrally through apertured bushing, has its reduced diameter upper end received in the lower end of the cavity 78 in fitting 76 and its enlarged lower end loosely received in the upper internal wall 74 of the retraction valve holder 68 whereby this retraction valve seat 75 and an associated washer gasket 80 are retained in the retraction valve holder by the fitting. The notched stem 81a of a conventional retraction valve 81 is slidably received in the through aperature 75a in the retraction valve seat 75, with the heat of the retraction valve 81 being positioned so as to seat against a valve seat 75b encircling the aperture 75a at the upper end of the retraction valve seat 75.

The retraction valve 81 is normally biased into seating engagement with the valve seat 75b, the position of the retraction valve 81 shown in FIG. 2, by means of compression spring 82 which abuts at one end against the head of the retraction valve 81 and which abuts at its other end against the flange shoulder 83a of a notch apertured valve stop 83 that is loosely received within the fitting 76.

As is well known, the retraction valve 81 is of a suitable configuration whereby it is operative to serve both as a check valve and as a retraction valve. Although a particular form of retraction valve and fitting arrangement has been illustrated and described, it will be apparent that other forms of retraction valves which are also operable as both check valves and retraction valves can be used in lieu of the specific retraction valve arrangement described and illustrated. For example, a ball type retraction valve and fitting arrangement, similar to that shown, for example, in the above-identified U.S. Pat. No. 3,648,673 can be utilized in lieu of the retraction valve and fitting arrangement shown.

Fuel flow to and from each of the pump chambers, as defined by a plunger 66 movable in its associated cylinder bore 67a in a plunger bushing 67 and, the controlled discharge of fuel to each of the associated fuel injection nozzles via an associated retraction valve and fitting arrangement is controlled, in accordance with the invention, by means of a pump control valve 110 and a solenoid actuated valve assembly, generally designated 140, associated therewith, both to be described in detail hereinafter.

A control valve sleeve 84, which can be formed as part of the pump body 5, or as shown, can be a separate element secured as by a shrink fit in the bore wall 55 of the pump body 5 is positioned so that its upper end surface 84a is located at or closely adjacent to the lower edge of an annular fuel supply groove 85 formed in the internal wall 55 of the pump body 5. Groove 85, of a suitable width, is formed with a predetermined inside diameter whereby this groove intersects a vertical passage 86 that extends through the bosses 45 and 46 of the pump body 5 parallel but radially outward of the bore wall 55 therein. The passage 86, intermediate its ends, communicates with a radial fuel inlet passage 87 provided in the flange 47 of the pump body 5.

This inlet passage 87 is adapted for connection in a suitable manner to a fuel source, not shown, whereby the pump assembly is supplied with low pressurized fuel. In the particular construction shown, this connection is accomplished by means of a rectangular fuel supply block fitting 88 that is fixed, as by cap screws 90, to a flat outer peripheral surface 47a provided on one side of the flange 47 of the pump body 5. As best seen in FIGS. 1 and 2, this block fitting 88 is provided with a longitudinal extending blind bore passage 91 which is threaded at one end so as to be connectable by a fuel supply conduit, not shown, to the fuel source. This passage 91 is formed so as to intersect a transverse and inclined connecting passage 92 that is suitably located so as to be in flow communication with the inlet passage 87 in flange 47. An O-ring seal 93, positioned in a suitable annular groove 47b formed, for example, in flange 47, is used to effect a fluid tight seal between the flange 47 and the block fitting 88.

The bore wall 55 in the fuel pump body 5 is partly closed at its upper end by means of the solenoid pole piece 9 that has its radial flange portion 94 sandwiched between the cover 6 and the pump body 5. As best seen in FIG. 2, the solenoid pole piece 9 is of cylindrical configuration and includes the flange portion 94 and a depending cylindrical plug 95. This plug 95 is slidably received within the bore wall 55 and it is of a suitable axial extent so that the lower face 96 of the plug 95 terminates at or closely adjacent to the upper edge of the annular groove 85. An annular seal ring 97 positioned in a suitable annular groove, such as the groove 98 formed in the outer peripheral surface of the plug 95, is used to effect a fluid tight seal between the solenoid pole piece 9 and the pump body 5. In addition, a stepped plug 100 with an O-ring seal 101 encircling its reduced diameter portion is positioned in the passage 86 so as to effect a further fluid tight seal between the pump body 5 and the solenoid pole piece 9 by forming a seal plugging the upper end of passage 86.

The pump control valve 110 is rotatably journaled in the axial bore 111 of sleeve 84 and is operatively connected to the drive shaft 21 for rotation therewith by means of a coupling shaft 112 that extends through the bore wall 61 in the pump follower cage 60. As shown in FIG. 2, coupling shaft 112 is provided at its lower end with a driving coupling 114 that is provided with suitable opposed flats 115 and which is shaped complimentary to the slot 28 in the drive shaft 21 so as to be drivingly engaged thereby. The opposite end of the coupling shaft 112 is provided with a drive end 116 that has a circular outer peripheral surface whereby this end of the coupling shaft can be rotatably journaled, as by the roller bearing 117, in the bore wall 55 of the pump body 5. At its free end, the drive end 116 of the coupling shaft 112 is suitably slotted so as to provide opposed upstanding drive flats 118 that are arranged to abut against the complimentary shaped outer peripheral surface of a drive plate 120. Drive plate 120 is provided with an aperture therethrough that is appropriately shaped so as to define opposed flats, not shown, that are adapted to abut and effect a drive engagement between the drive plate 120 and the reduced diameter end 110a of the pump control valve 110, this reduced diameter end of the pump control valve 110 also being provided with opposed drive flats, not shown.

Coupling shaft 112 is thus operatively connected to the pump control valve 110 whereby to effect rotation thereof in timed relationship with the rotation of the drive shaft 21 while at the same time fixing the pump control valve against axial movement in one direction, downward with reference to FIG. 2. Movement of the pump control valve 110 in the opposite direction is limited by means of a thrust washer 121 that encircles the pump control valve 110 closely adjacent to its lower end, with this thrust washer 121 being supported by a retaining ring 122 that is fixed in a suitable annular groove provided for this purpose in the pump control valve 110.

Figures 3, 4, 5, 6:
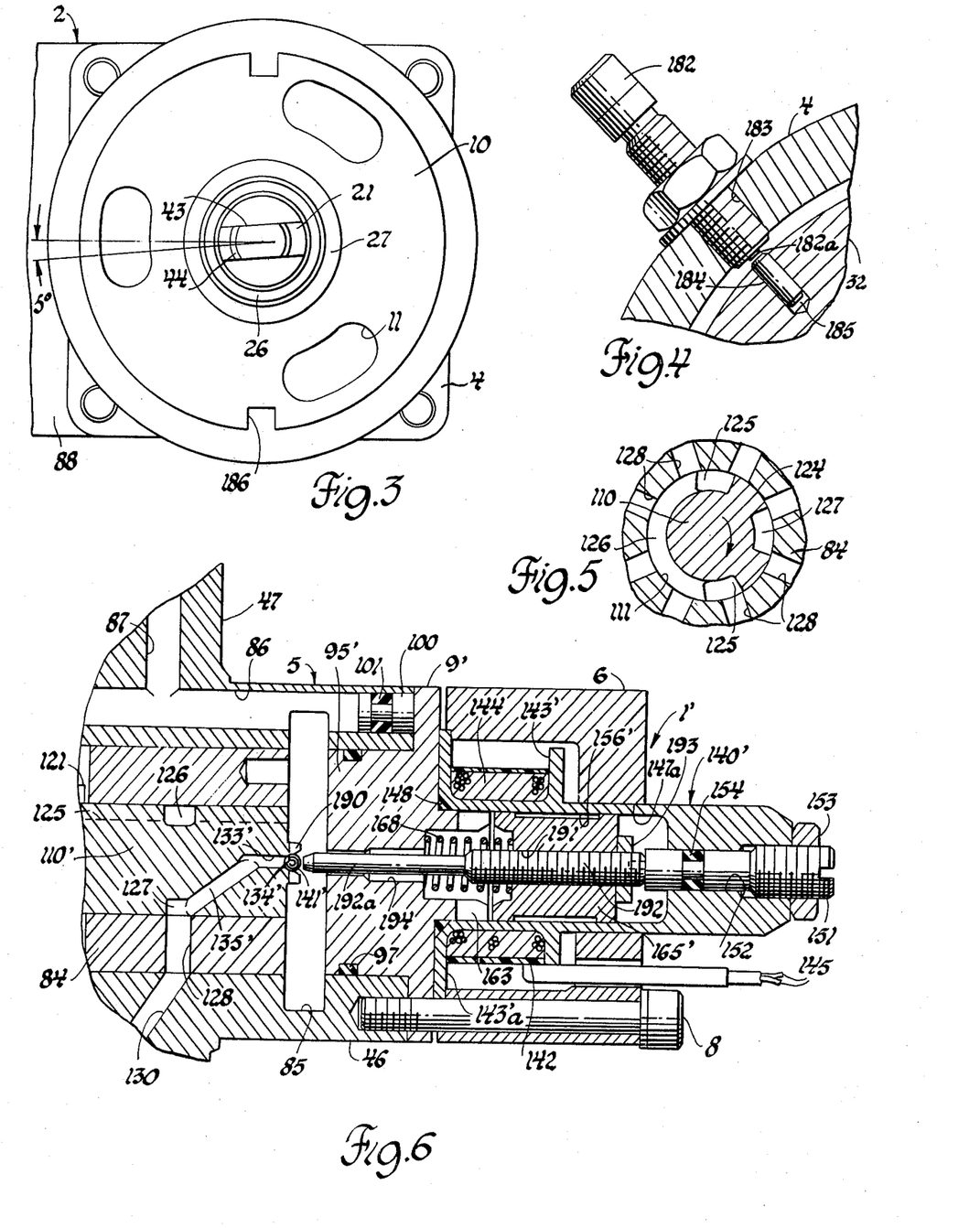

Pump control valve 110 is provided with an outer peripheral seal land 124 of a suitable predetermined outside diameter relative to the internal diameter of the bore 111 in sleeve 84. As best seen in FIGS. 2 and 5, the seal land 124 is interrupted by a pair of straight axial extending grooves 125 that are circumferentially spaced apart approximately 161° 42' from their center lines in one direction and approximately 198° 18' in the other direction, in the construction shown and as best seen in FIG. 5. In addition the seal land 124 is also interrupted by an arcuate supply groove 126 formed therein that extends in the 198° 18' direction so as to interconnect the pair of grooves 125. Another arcuate spill groove 127, of predetermined limited peripheral extent, is formed on the outer peripheral land surface of the pump control valve in the 161° 42' direction intermediate the grooves 125, as best seen in FIG. 5. The grooves 126 and 127 are located axially on the pump control valve 110 so as to be radially aligned for sequential flow communication with each of a plurality of circumferentially equally spaced apart radial ports 128 provided in the sleeve 84, the number of these ports again corresponding to the number of cylinders of the engine, not shown. Eight such ports 128 being shown in FIG. 5, in the pump illustrated for use with an eight cylinder engine.

Each such ports 128 in the sleeve 84 is, in turn, aligned with one end of an associated inclined radial passage 130 in the pump body 5 with each such radial passage 130 being located and inclined so as to extend from bore wall 55 whereby to intersect the enlarged upper portion of an associated bore 56 at a position for direct fluid communication with the radial passage 73 of an associated retraction valve holder 68. As will be apparent, the number of radial passages 130 will also correspond to the number of cylinders in the engine, not shown.

As will be apparent, the axial grooves 125 and the groove 127 are radially aligned in predetermined orientation relation to the flats, not shown, on the drive end 110a of the pump control valve 110. In turn, it will also be apparent that the drive connection between the pump control valve 110 and the drive shaft 21, via drive coupling 112, is suitably arranged relative to the drive flats 43 on the drive shaft 21 whereby a predetermined timing position of groove 127 can be established for coming into flow registry with a particular passage 128 of the pump assembly used for supplying fuel, in a manner to be described, to a particular cylinder, such as for example the number one cylinder of the engine, not shown.

At its upper end, with reference to FIG. 2, the pump control valve 110 is provided with an axial blind stepped bore to define, starting from the top and in succession, a valve guide bore 131 of predetermined internal diameter, an enlarged internal diameter cylindrical wall 132 and a cylindrical passage 133. A conical valve seat 134 formed in the pump control valve 110 is located so as to encircle the upper end of passage 133. The passage 133, at its lower end, is connected in flow communication with a downwardly inclined, radial passage 135 that opens into the arcuate spill groove 127 on the outer peripheral surface of the pump control valve 110, FIG. 2. Accordingly, passages 133 and 135 may be referred to as a spill passage means for the by-pass of fuel from each of the pump chambers in a manner to be described. The pump control valve 110 is also provided with a radial through port 136 (FIG. 2) that intersects wall 132, for a purpose described hereinafter.

In accordance with the invention, flow through passages 133 and 135 is controlled by means of the separate valve 141 of the solenoid actuated valve assembly 140.

In the embodiment shown in FIG. 2, the solenoid actuated valve assembly 140 includes a tubular bobbin 143 having a magnetic wire, solenoid coil 144 wrapped around it and enclosed by suitable electrical insulation 142. Coil 144 is connectable by a pair of electrical leads 145, which extend through an aperture 146 in cover 6, to a suitable source of electrical power via a conventional fuel injection electronic control circuit, not shown, whereby the solenoid coil 144 can be energized during each sequential operational cycle of the respective cylinders of the associated engine, not shown, as a function of the operating conditions of the engine in a well known manner.

Bobbin 143 is positioned in the lower portion of the stepped axial bore cavity 147 provided in the cover 6, with the lower flange 143a thereof suitably clamped to the upper surface of the flange portion 94 of solenoid pole piece 9 by means of the cover 6. As shown, in FIG. 2 the lower portion of the cover 6 is provided with an annular groove to receive the flange 143a closely adjacent to its outer peripheral edge. An O-ring seal 148 is suitably sandwiched between the bobbin 143 and the solenoid pole piece 9 whereby to effect a fluid tight seal relative to these elements.

The bobbin 143 is provided with an integral, upstanding cylindrical boss 150 of an axial extent so this boss 150 extends up through the reduced diameter portion 147a of the bore cavity 147 in cover 6. An externally threaded stop member 151 is axially adjustably positioned in the axial stepped bore 152 that extends through the boss 150, as by having the external threads of the stop member 151 in threaded engagement with the internal threads at the upper end of bore 152. Axial adjustment of the stop member is maintained by means of a lock nut 153 threaded onto the external threads of the stop member 151 so as to abut against the upper surface of boss 150. An O-ring seal 154 positioned in a suitable groove provided for this purpose in the stop member 151 is used to effect a fluid tight seal between the stop member 151 and the boss 150 portion of bobbin 143.

The solenoid pole piece 9 is formed of suitable material so that, in effect, this solenoid pole piece is operable as the pole piece of the solenoid actuated valve assembly 140. For this purpose the solenoid pole piece 9 has an integral upstanding cylindrical boss, that is slidably received in the lower, cylindrical guide bore 156 in bobbin 143 so as to extend upward a predetermined axial distance part way into this guide bore 156 in bobbin 143.

The solenoid pole piece 9, including the plug 95 and boss 155 thereof, is provided with a stepped axial bore to define, in succession starting from the upper end with reference to FIG. 2, a cylindrical internal wall 157, an intermediate internal wall 158 and a lower cylindrical internal wall 160. The internal wall 157 is of greater internal diameter than wall 158 but it is smaller in diameter than wall 160, in the construction shown. Walls 157 and 158 are interconnected by a flat shoulder 161. Walls 158 and 160 are interconnected by a tapered wall 162. In the embodiment illustrated in FIG. 2, the internal diameters of tapered wall 162 and wall 160 are sufficiently larger than the outside diameter of the pump control valve 110 so as to form with the upper tapered end 110a thereof an annular fuel well 164 which, at its lower end, is in fluid communication with the annular groove 85 in pump body 5. The boss 155 of the solenoid pole piece 9, adjacent to its free upper end, is provided with a pair of through slots 163 preferably formed at right angles to each other, only one such slot 163 being shown in FIG. 2.

The plunger 165 of the solenoid actuated valve assembly 140 is slidably positioned in the guide bore 156 above the free end of the boss 155 of pole piece 9 in position to cooperate therewith. Plunger 165 has a depending central stem 166, which in the construction illustrated has a wear tip 167 of suitable hard material fixed thereto. The axial extent of stem 166 with the wear tip 167 thereon is such whereby it is adapted to abut against the upper end of the valve 141 so as to force this valve in an axial direction, downward relative to FIG. 2, upon energization of the solenoid whereby to force valve 141 into seating engagement against the valve seat 134.

The plunger 165 is normally biased in an axial direction, upward with reference to FIG. 2, by a compression spring 168 whereby the lower surface edge of the plunger 165 is axially spaced apart from the free end of the boss 155 of the solenoid pole piece 9 whereby to define a predetermined working air gap therebetween. In this position, as shown in FIG. 2, the free end of the stem portion of the plunger 165 is axially spaced apart from the top end of the valve 141 whereby to permit this valve 141 to move in an axial direction out of seating engagement with the valve seat 134. The axial extent of the working air gap and therefor also of the clearance space between the plunger 165 and the valve 141 is controlled by axial positioning of the stop member 151.

The valve 141, although actuated by the plunger 165 of the solenoid assembly, is formed as a separate element whereby it is adapted to be freely rotatable with the pump control valve 110 with which it cooperates. The valve 141, in the preferred embodiment shown in FIG. 2, is in the form of a needle valve having a stem 170 with a conical tip 171 at its lower end of a suitable size and preferably stepped configuration for mating engagement with the valve seat 134. The stem 170 at its upper end is preferably provided with a semi-spherical free end surface 172 to provide for reduced frictional contact with the wear tip 167 of bushing 165 when in contact therewith during rotation of the valve 141 with the pump control valve 110.

As shown, stem 170 intermediate its ends is provided with a plurality of equally circumferentially spaced apart axial extending guide lands 173 of a nominal predetermined outside diameter whereby this portion of the valve stem can be slidably guided by the guide bore 131 in the pump control valve 110 with the recessed portions between these guide lands 173 defining with the wall of the guide bore 131 a plurality of axial extending passages which open at opposite ends into the fuel well 164 and the annular cavity defined between valve 141 and wall 132 within the pump control valve 110. The upper continuous outer peripheral land portion of the valve stem 170 loosely extends upward through the wall 158 of the solenoid pole piece 9 whereby the end surface 172 thereof can be engaged by the plunger 165. As shown in FIG. 2, the valve 141 is normally free to be moved, by pressure of fuel in the passages 135, 133, out of seating engagement with the valve seat 134 for a purpose to be described.

Fuel supplied to the pump assembly thus far described is supplied thereto during engine operation on a continuous basis with the quantity supplied being in excess of that to be pumped to the fuel injection nozzles, not shown, and this fuel is thus also used for lubricating the various operating elements of the pump assembly. The excess fuel supplied to the pump assembly is returned, in the construction shown, via a pair of radial outlet ports 180 and 181 provided for this purpose in the housing 4, as seen in FIG. 2. These ports 180 and 181 are internally threaded so as to be adapted for connection by a suitable fitting to a conduit, both not shown, whereby fuel can be returned to a fuel tank, not shown, for the associated engine. The lower port 181 is used in addition to the upper port 180 for fuel return, in the construction shown, so as to insure adequate flow of lubricating oil through and around the bearings 22.

In the construction illustrated, means are also provided in the subject pump assembly whereby to provide a timing signal, for example, of the rotational position and speed of the cam 32 for use by the electronic control circuit, not shown, that would be normally associated with the pump assembly. For this purpose, a suitable, commercially available, magnetic sensor 182 (FIG. 4) is secured by threaded engagement in an internally threaded port 183 provided in the housing 4. The sensor end 182a of sensor 182 is positioned closely adjacent to but spaced from the end of a trigger pin 184 suitably fixed in a radial cylindrical aperture 185 provided for this purpose in the outer periphery of the cam 32.

To effect operation of the subject pump, it would of course be fixed to an associated, previously timed engine so as to be driven thereby and, in addition, the pump would be statically timed to the engine. For this purpose, the mounting flange 10 is first loosely fixed to a suitable mounting flange on the engine, not shown, and the flats 43 would be aligned relative to a horizontal axis through the shaft 21, with reference to and as shown in FIG. 3. The pump housing would then be rotated by suitable means, as for example by means of a spanner wrench engaged in the notches 186 provided for this purpose on the flange 10, until an index mark, not shown, on the pump housing, for example, is aligned with a timing mark on the associated engine, not shown.

With the fuel injection pump statically timed to the engine, the injection of fuel into each cylinder of the engine will occur at the proper time relative to the piston stroke in the cylinder. The actual fuel injection timing, while the engine is operating, will be automatically changed by predetermined sequential energization of the solenoid coil 144 as controlled by the electronic control circuit, not shown.

During engine operation, the drive shaft 21 is rotated, counterclockwise, as seen in FIG. 3 with reference to the construction shown, to cause corresponding rotation of the cam 32 whereby to sequentially effect reciprocating movement of each pump plunger 66 through a pump stroke and a suction stroke in a conventional manner. During a pump stroke of a pump plunger 66, the fuel in the pump chamber above the free end of the plunger 66 will be pressurized so as to cause the fuel from that pump chamber to be delivered to either the associated fuel nozzle, not shown, via the associated retraction valve arrangement described or to the pump control valve 110. The pump control valve 110 is operatively connected to the cam 32 for synchronized rotation therewith so that the control spill groove 127 thereon will come into registry with a passage 128 in the sleeve valve 84 at the instant in the associated pump plunger 66 operation where fuel delivery is about to start, a position corresponding to the rotative position of the pump control valve 110 shown in FIG. 2.

If at that time the coil 144 of the solenoid actuated valve assembly 140 is not energized, the pressurized fuel from this pump chamber can then effect unseating of the control valve 141 from its seat 134, if the valve is not already unseated, to allow pressurized fuel to spill back into the interior of the pump housing to comingle with the supply of fuel contained therein. Then, when the coil 144 is energized, the plunger 165 of the solenoid assembly is caused to move in a direction, downward with reference to FIG. 2, against the bias of spring 168 so as to force the control valve 141 into seating engagement with the valve seat 134 whereby to seal off fuel flow through the spill passages 135 and 133. As this occurs, the pressurized fuel from the pump chamber will then effect unseating of the associated retraction valve 81 to allow the fuel to be delivered to the fuel injection nozzle, not shown, associated with that pump chamber.

The end of fuel delivery to this fuel injection nozzle, not shown, occurs when the solenoid coil 144 is again de-energized. When coil 144 is de-energized, the plunger 165 is then moved in a direction, upward with reference to FIG. 2 to the position shown, by the force of spring 168 to then allow the pressurized fuel from that pump cylinder to effect unseating of the control valve 141 whereby by-pass fuel flow is again re-established, thus lowering the pressure in the fuel conduit system leading to that fuel injection nozzle, not shown, to a pressure below the fuel injection nozzle closing pressure. Fuel injection from that fuel injection nozzle is then terminated.

Thereafter, as the pump control valve 110 continues to rotate the leading groove 125 and the fuel supply groove 126 will come into registry with the associated passages 128 and 130 for that particular pump chamber. Thus, this pump chamber can again be filled with fuel as the fall of the cam 32 comes in registry with the associated follower roller 65 for that plunger 66 to permit movement of the pump plunger 66 in the suction stroke direction.

The operation just described is for a predetermined timing interval with only one pump chamber in the view as shown in FIG. 2. However, it will be apparent that this operation is simply repeated for any number of pump chambers in the pump assembly. Thus in the embodiment shown this operation would occur eight times during each complete revolution of the drive shaft 21.

The amount or quantity of fuel output from each pumping chamber to its associated fuel injection nozzle, not shown, is a function of how long the solenoid coil 144 is energized to interrupt the by-pass of fuel from the particular pump chamber and, of course, the injection timing, that is both start and end of injection, is scheduled by varying the instant that by-pass is stopped and then again initiated. This variance is accommodated within the pump assembly shown by having the spill groove 127 sufficiently circumferentially elongated to allow phasing shifts to occur between solenoid operation and pumping action and still communicate the by-pass flow for proper functioning of the pump device for a particular engine.

An alternate embodiment of a pump assembly, generally designated 1', with a solenoid actuated valve assembly 140' in accordance with the invention incorporated therein is shown in part only in FIG. 6, the remaining components of the pump assembly not being shown since they are identical to those illustrated in FIGS. 1 through 5, inclusive, and previously described hereinabove. In this alternate embodiment similar parts are designated by similar numerals but with the addition of prime (') where appropriate. Thus in the alternate embodiment only the pump control valve 110' and solenoid actuated valve assembly 140' are in an alternate embodiment structural form and are shown in FIG. 6.

As shown in FIG. 6, the pump control valve 110' has an axial blind bore extending from its free end to define a spill passage 133'. A conical valve seat 134' encircles one end of this spill passage 133', the opposite end of the spill passage 133' being connected by the passage 135' to the spill groove 127 on the outer peripheral surface of the pump control valve 110'.

Flow through the spill passages 133' and 135' is controlled by a control valve 141', in the form of a ball valve, as shown, which is adapted to move into and out of engagement with valve seat 134'. This ball valve 141' is loosely supported by a cross slotted cage 190 formed integral with and at the free end of the pump control valve 110' so as to permit limited movement of the valve 141' into and out of seating engagement with valve seat 134'.

The solenoid actuated valve assembly 140' has its plunger 165', which is slidably received in the bore 156' of the solenoid bobbin 143', provided with a central axial through internally threaded bore 191. An externally threaded actuator stem 192 is adjustably threadedly engaged in the bore 191 whereby the reduced diameter free end 192a of this actuator stem 192 is positioned so as to abut and force the valve 141' into seating engagement with the valve seat 134' when the coil 144 of the solenoid actuated valve assembly 140' is energized. A lock nut 193 threaded onto the actuator stem 192 is used to retain it releasably secured to the plunger 165'.

As shown, in FIG. 6, the pole piece 9' of the solenoid actuated valve assembly 140' is provided with a through stepped bore 194 through which the lower reduced end 192a of the actuator stem 192 loosely extends. As in the previous embodiment described, the plunger 165' is normally moved in an axial direction away from the pole piece 9' by means of a spring 168 whereby a working air gap exist between the slotted end of the pole piece 9' and the adjacent end of the plunger 165' when the solenoid coil 144 thereof is not energized. In this position of the plunger 165', the free end of the actuator stem 192 is axially spaced from the valve seat 134' a predetermined distance to permit opening movement of the valve 141' relative to this valve seat.

The operation of this alternate embodiment fuel injection pump assembly 1' is similar to that previously described relative to the preferred embodiment of the subject pump.

The embodiments of the invention in which an exclusive property or privilege is claimed are defined as follows:

1. A fuel injection pump comprising, in combination, a housing means having a central stepped bore defining a valve sleeve closely adjacent to one end of said housing means, a solenoid assembly fixed to and closing said one end of said housing means; a control valve rotatably journaled in said valve sleeve and positioned to define an annular fuel chamber with one end of said solenoid assembly; said housing means having a passage in communication at one end with said fuel chamber and connectable at its other end to a source of fuel, a plurality of pumping means equally circumferentially spaced around said bore; each of said pumping means having a pump chamber connected to a fuel passage in communication with said bore and to a valve controlled fuel discharge outlet means; and, a drive means journaled in the opposite end of said housing and operatively connected to said pumping means to effect sequential operation thereof and to said control valve for rotating said control valve; said control valve having a fuel control means thereon to form with said valve sleeve a supply chamber in communication with said fuel chamber and adapted to be placed in communication sequentially with each of said fuel passages, said control valve further having a spill passage means therein with one end thereof radially aligned for sequential communication with each of said fuel passages during rotation of said control valve and the opposite end thereof being positioned coaxial with said bore and operatively opening into said fuel chamber, said solenoid assembly having an armature and a separate valve actuated by said armature and positioned so as to control flow from said pump chambers via said spill passage means into said fuel chamber; said valve being journaled whereby it can rotate with said control valve, said valve being operative as controlled by said armature whereby both the amount of fuel discharged into each of such fuel discharge outlet means and the timing thereof is controlled by operation of said armature of said solenoid assembly to control spill flow out through said spill passage means.

2. A fuel injection pump comprising, in combination, a housing means having a central stepped bore defining a valve sleeve closely adjacent to one end to said housing means, a solenoid assembly fixed to and closing one end of said housing means; a control valve rotatably journaled in said valve sleeve and positioned to define with one end of said solenoid assembly an annular fuel chamber; a passage in said housing means in communication at one end with said fuel chamber and connectable at its other end to a source of fuel, a plurality of pumping means equally spaced circumferentially around said bore, each of said pumping means including a plunger journaled in a pump bushing to define a pump chamber; each said pump chamber being connected to a fuel passage in said housing means and to a valve controlled fuel discharge outlet means connectable to a fuel injection nozzle; a drive means journaled in the opposite end of said housing and including a cam means operative to effect reciprocation of each of said plungers and being operatively connected to said control valve to effect rotation thereof; said control valve having a fuel control means thereon adapted to form with said valve sleeve a supply chamber in communication with said fuel chamber and adapted to be placed in communication sequentially with each of said fuel passages, said control valve further having a spill passage means therein with one end thereof aligned for sequential communication with each of said fuel passages during rotation of said control valve and the opposite end thereof being coaxial with said bore and opening into said fuel chamber, said solenoid assembly including a valve operatively connected to said control valve to control flow from said spill passage therein to said fuel chamber and a spring biased armature operatively positioned whereby when said solenoid assembly is energized said armature will move said valve to a position blocking flow through said spill passage means thereby controlling by-pass flow of fuel from an associated said pump chamber during a pump stroke of an associated said plunger and whereby when said solenoid assembly is not energized, said armature is positioned to permit movement of said valve to a position allowing flow through said spill passage means to said fuel chamber.

3. A fuel injection pump comprising, in combination, a housing means having a central bore means defining a valve sleeve closely adjacent to one end to said housing means; a solenoid assembly fixed to and closing said one end of said housing means; said housing means having a passage means in communication at one end with said bore means and connectable at its other end to a source of fuel; a plurality of pumping means equally spaced circumferentially around said bore; each of said pumping means having a fuel passage connected to a valve controlled fuel discharge conduit and to a fuel by-pass passage; a drive means journaled in said housing and operatively connected to said pumping means; a control valve rotatably journaled in said valve sleeve, operatively connected to said drive means, and positioned to define with one end of said solenoid assembly an annular fuel chamber; said control valve having a fuel control portions thereon operable in said bore means to form therewith a fluid supply chamber in communication with said fuel chamber and adapted to be placed in communication sequentially with each of said by-pass passages for supplying fuel to said pumping means, said control valve further having a spill passage therein with one end thereof radially aligned for sequential communication with each of said by-pass passages during rotation of said control valve and the opposite end thereof being coaxial with said bore and opening into said fuel chamber, said solenoid assembly having a valve operatively associated with said control valve during rotation thereof by said drive means to control flow from said spill passage into said fuel chamber; an armature movable when said solenoid is energized to move said valve to a position blocking flow from said spill passage; and, a spring operatively associated with said armature to normally move said armature to a position out of engagement with said valve whereby said valve is free to be unseated by pressurized fuel from said pumping means whereby this fuel will be by-passed when said solenoid is not energized.

4. A fuel injection pump for an internal combustion engine for an N number of cylinders each with a fuel injection nozzle associated therewith, said fuel injection pump including a housing means defining a valve sleeve internally thereof and a fuel inlet passage means to said valve sleeve; an N number of pump means in said housing means equally spaced around said valve sleeve; an N number of fuel passages in said housing means with each of said fuel passages being connected to an associated one of said pump means; an N number of valve controlled fuel discharge conduits in said housing means with each of said valve controlled fuel discharge conduits being in flow communication at one end with an associated one of said pump means and being connectable at its opposite end to an associated fuel injection nozzle; drive means journaled in said housing means and operatively connected to said pump means whereby said pump means are sequentially operative for pressurizing fuel; a control valve rotatably journaled in said valve sleeve and connected to said drive means for rotation therewith; said control valve having a fuel supply portion thereon for supplying fuel from said fuel inlet passage means via each of said fuel passages to each of said pump means; said pump control valve further having a spill passage associated therewith for receiving fuel under pressure sequentially from each of said pump means through its associated fuel passage; one end of said spill passage being co-axial with said valve sleeve and located for fluid communication with said fuel inlet passage means; and a solenoid actuated valve assembly operatively connected to said housing means, said solenoid actuated valve assembly including a separate valve operatively associated with said pump control valve and rotatable therewith for controlling flow of pressurized fuel through said spill passage during a pump stroke of a respective pump means and a solenoid connectable to a means for providing electrical signals in timed relation to the engine so as to move said valve to block flow through said spill passage to thereby effect the beginning of a fuel injection period and then to permit opening of said valve relative to said spill passage to end the fuel injection period.

* * * * *